ABSTRACT OF THE DISCLOSURE

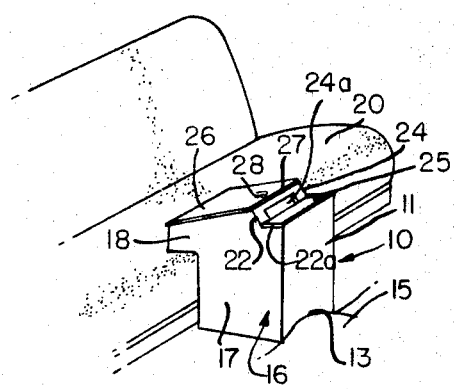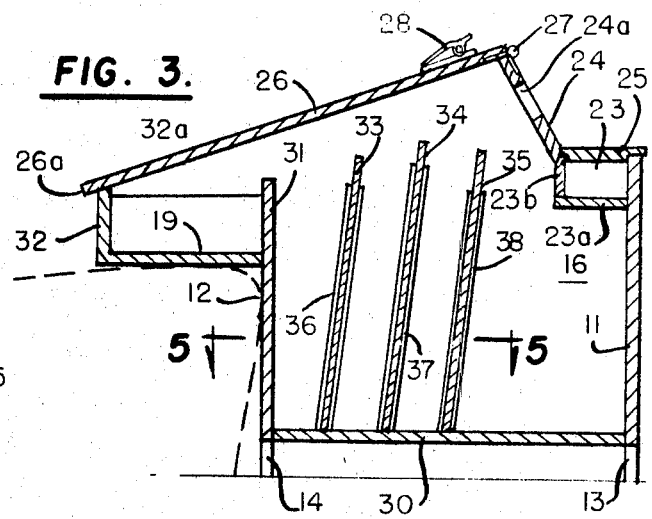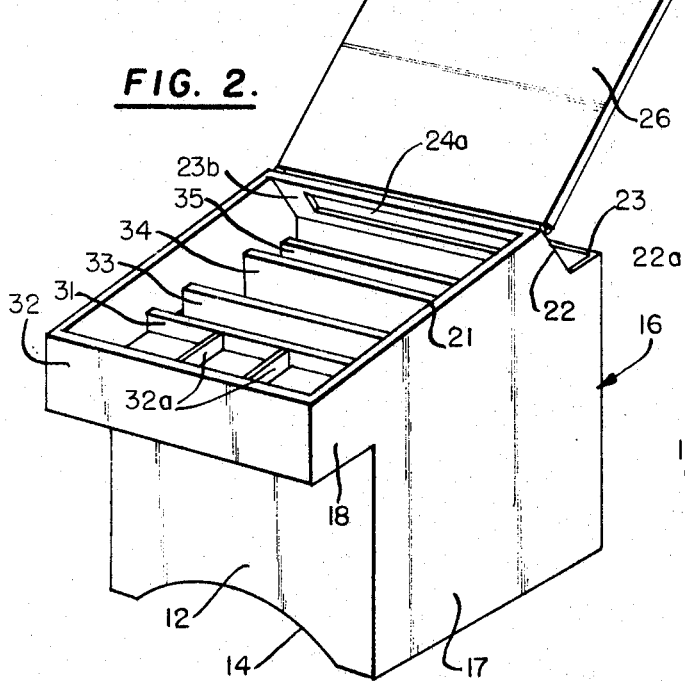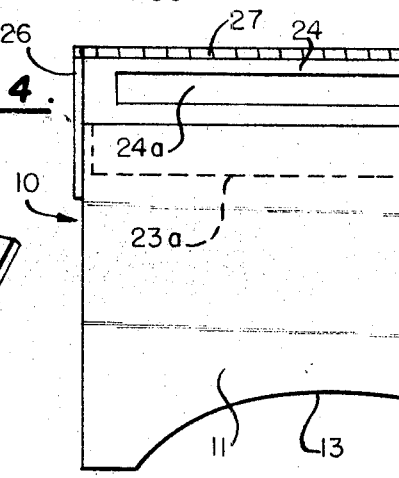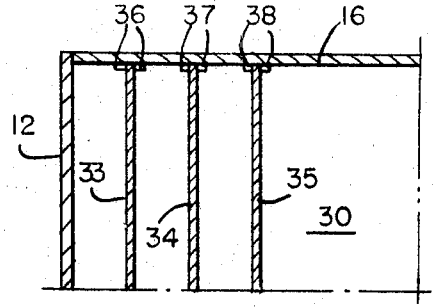
INVENTOR
Kenneth E. Hudson
BY
ATTORNEY 3,517,978
VEHICLE FILE CABINET
Kenneth E. Hudson, P.O. Box 4900,
Sacramento, Calif. 95825
Filed June 17, 1968, Ser. No. 737,474
Int. Cl. A47b 27/00, 94/04
U.S. Cl. 312—235     1 Claim

A portable file cabinet for use in an automobile consisting of a receptacle removably seating partially on the floor over the drive shaft and partially on the front seat, having an inclined hinged top surface for use as a desk and removable interior dividers and/or shelves arranged as desired.

---

This invention relates to a portable removable file cabinet particularly adapted to be positioned partially on the floor over the drive shaft, and partially on the front seat of an automobile, which may serve as a filing cabinet for a road salesman, provided with removable partitions to accommodate sales records, daily transactions, file cards, business cards and the like.

A primary object of the invention is the provision of a cabinet of this nature which may be readily adapted to use by various individuals in traveling, which is provided with an inclined surface which may serve as a desk, and a file cabinet to accommodate records in arranged order so as to be readily accessible when needed while traveling.

A further object of the invention is the provision of a device of this character wherein the interior arrangement may be readily varied in accordance with the needs of the user.

A further object of the invention is the provision of a device of this nature which may be readily removed when not in use and which, when in position, will accommodate itself to the contours of the vehicle so as to remain in position without undue movement.

Still another object is to provide a convenient and readily accessible storage unit immediately available to the driver for commodities of various sorts which may be required in the course of business or during travel.

Other objects will in part be obvious, and in part be pointed out as the description of the invention proceeds and shown in the accompanying drawing wherein:

FIG. 1 is a perspective view showing the device of the instant invention in position adjacent the front seat of a motor vehicle such as a passenger automobile;

FIG. 2 is a perspective view of the device alone, with the hinged lid in open position;

FIG. 3 is a vertical sectional view taken substantially along the longitudinal center line of the device;

FIG. 4 is a front elevational view of the device partially broken away; and

FIG. 5 is a fragmentary sectional view taken substantially along the line 5—5 of FIG. 4.

Similar reference characters refer to similar parts throughout the several views of the drawing.

Having reference now to the drawing in detail, the device of the instant invention consists of a cabinet structure generally indicated at 10 which includes front and rear walls 11 and 12 respectively, each of which is provided with an arcuate cut out portion 13 and 14 respectively which, when the device is positioned in a motor vehicle, are adapted to conform to the contour of the central tunnel 15 which normally accommodates the transmission and/or drive shaft of the vehicle. The front and rear walls are connected by a pair of side walls 16, each consisting of a relatively rectangular lower portion 17 and a rearward offset portion 18, the bottom of which is closed by a transverse plate 19 which is adapted to seat on the central portion of the front seat 20 of the vehicle.

The major portion of the top of each side wall is inclined rearwardly as at 21, the upper or forward portion of the incline terminating in a downwardly and forwardly inclined portion 22, and a front flat portion 22a. An inclined panel 24 closes the space between inclined portions 22 and is cut away as at 24a to provide a convenient handle. An inclined lid 26 is hinged as by a piano-type hinge 27 at the top of inclined portions 22, and may serve as a portable desk adjacent the driver's right hand. Lid 26 is of slightly greater size than the cabinet, to provide an overlap 26a to facilitate lifting the lid.

Horizontal and vertical partitions 23a and 23b define a forward recess 23 adapted to hold tissues, cigarettes or similar articles in a convenient and readily accessible position. A recessed flat closure plate 25 may, if desired, be provided for recess 23, and serves as a shelf for supporting glasses or the like. An intermediate tray 35a on the inner side of wall 11 may contain disposable tissue or the like.

A conventional clip 28 is provided for retaining papers or the like on the desk top 26.

A bottom wall 30 is provided, as best shown in FIG. 3, closing the bottom of the device but positioned above the top of the cut out portions 13 and 14 so as to seat on the top of the tunnel 15.

Any desired interior arrangement may be provided, but a preferred arrangement is shown in FIG. 3 wherein the top of front wall 12 extends upwardly to provide a partition 31 with horizontal member 19 and the closure 32 extending across the ends of projecting portions 18, thus providing a convenient separate receptacle readily accessible by the opening of closure 26 for small articles. Transverse partitions 32a subdivide the receptacle to provide a tray for cigarettes and file cards.

A series of partitions or dividers 33, 34 and 35 are removably positioned interiorly of the main body of the device, and may be held in slightly inclined position by opposed pairs of channels 36, 37 and 38 positioned upon the interior of the respective side walls 16. The slight incline of the partitions facilitates the insertion and removal of the container. Alternatively, partitions 33, 34 and 35 may be movably mounted on a horizontal rod extending across the lower portion of the device, as is conventional in filing cabinets.

When the device is used as a storage receptacle, removable horizontal shelves may be substituted for the partitions, or any other desired internal arrangement may be employed in accordance with the use to which the device is to be put.

The cabinet may be constructed of light weight masonite board, of metal, plastic sheeting, or any other desired conventional material.

It will be seen that when the device is in position, ready access may be had to the interior thereof by opening the lid 26, and the contents may be readily classified and separated by the various partitions.

It will also be seen that the device will seat sturdily on the tunnel, floor and front seat of the vehicle in such manner as to resist accidental dislodgment, but may be readily removed from the vehicle when desired.

It will also be seen that when closed, the top surface of the lid 26 serves as a convenient and readily accessible desk.

From the foregoing it will now be seen that there is herein provided an improved vehicle file cabinet which accomplishes all of the objects of this invention and others, including many advantages of great practical utility and commercial importance.

I claim:

1. A single piece, portable cabinet construction for use in motor vehicles, comprising: a front wall and a rear wall having arcuate cut out portions in the bottoms thereof adapted to fit over the transmission tunnel as the only means of stabilizing and supporting the cabinet construction for preventing movement while the auto is being driven; two single side walls, each having an extending portion at the top rear adapted to overlie the front seat, and a rearwardly inclined top surface; a bottom wall positioned above the top of the cut out portions; a single rearwardly inclined top portion hinged at the uppermost portions of the inclined top surfaces of said side walls; and removable partitions mounted within the cabinet construction, the cabinet construction having a cut out portion formed in the top of said side walls forwardly of the hinge with fixed top cover portions secured between said cut out portions, one of said top cover portions having an aperture therein for hand carrying the cabinet construction and for facilitating carrying in that said inclined top portion and said front wall face downward toward the ground at an incline while being carried because of the location of said aperture in relationship to the diagonal center of gravity of the cabinet construction when in normal use as a receptacle.

References Cited

UNITED STATES PATENTS

| | | | |
|---|---|---|---|
| 2,678,682 | 5/1954 | Thomas | 297—194 |
| 3,061,394 | 10/1962 | Whetstone | 312—235 X |
| 3,279,872 | 10/1966 | Howke | 312—235 |
| 3,304,143 | 2/1967 | Connell | 312—235 X |

CASMIR A. NUNBERG, Primary Examiner

U.S. Cl. X.R.

297—194